United States Patent
Huang et al.

(10) Patent No.: US 10,903,697 B2
(45) Date of Patent: Jan. 26, 2021

(54) METHODS AND SYSTEMS FOR MULTI-PHASE COIL CONTROL

(71) Applicant: WiTricity Corporation, Watertown, MA (US)

(72) Inventors: Chang-Yu Huang, Auckland (NZ); Mickel Bipin Budhia, Auckland (NZ); Michael Le Gallais Kissin, Auckland (NZ); Jonathan Beaver, Auckland (NZ); Nicholas Athol Keeling, Benway Lodge (AU)

(73) Assignee: WiTricity Corporation, Watertown, MA (US)

( * ) Notice: Subject to any disclaimer, the term of this patent is extended or adjusted under 35 U.S.C. 154(b) by 56 days.

(21) Appl. No.: 16/358,583

(22) Filed: Mar. 19, 2019

(65) Prior Publication Data
US 2020/0303968 A1 Sep. 24, 2020

(51) Int. Cl.
| | | |
|---|---|---|
| *B60L 53/122* | (2019.01) | |
| *H02J 50/40* | (2016.01) | |
| *H02J 50/80* | (2016.01) | |
| *H02J 50/10* | (2016.01) | |
| *H02J 7/02* | (2016.01) | |

(52) U.S. Cl.
CPC ............ *H02J 50/40* (2016.02); *B60L 53/122* (2019.02); *H02J 7/025* (2013.01); *H02J 50/10* (2016.02); *H02J 50/80* (2016.02)

(58) Field of Classification Search
CPC ......... B60L 53/122; H02J 7/025; H02J 50/10; H02J 50/40; H02J 50/402; H02J 50/80

USPC .......................................................... 307/104
See application file for complete search history.

(56) References Cited

U.S. PATENT DOCUMENTS

| | | | | |
|---|---|---|---|---|
| 10,033,224 | B2* | 7/2018 | Bae ..................... | H04B 5/0087 |
| 2013/0127254 | A1* | 5/2013 | Miichi .................... | H02J 50/90 |
| | | | | 307/104 |
| 2014/0174870 | A1* | 6/2014 | Niizuma ................. | B60L 53/39 |
| | | | | 191/10 |
| 2015/0042171 | A1* | 2/2015 | Kohara .................... | H02J 5/005 |
| | | | | 307/104 |
| 2015/0270718 | A1* | 9/2015 | Hwang ................ | H04B 5/0075 |
| | | | | 307/104 |
| 2016/0043567 | A1* | 2/2016 | Matsumoto ............. | H02J 7/025 |
| | | | | 307/104 |
| 2016/0064988 | A1* | 3/2016 | Ku ........................ | B60L 53/126 |
| | | | | 320/108 |
| 2016/0064994 | A1* | 3/2016 | Ku ....................... | H04B 5/0037 |
| | | | | 307/104 |
| 2016/0190855 | A1* | 6/2016 | Katabi .................... | H02J 50/12 |
| | | | | 320/108 |
| 2017/0063160 | A1* | 3/2017 | Sato ........................ | H02J 50/80 |

(Continued)

*Primary Examiner* — William Hernandez
(74) *Attorney, Agent, or Firm* — Colby Nipper PLLC

(57) ABSTRACT

Certain aspects of the present disclosure provide methods and apparatus for multi-phase coil control in power transfer systems. One example power transfer device generally includes a plurality of coils configured to generate at least one charging field, the plurality of coils comprising a first coil and a second coil, and a controller configured to identify that a coupling factor between the first coil and a third coil, which is external to the power transfer device, is at or below a threshold, and to adjust, based on the identification, one or more parameters associated with a current applied to the first coil to transfer power from the first coil to the second coil.

23 Claims, 8 Drawing Sheets

(56) References Cited

U.S. PATENT DOCUMENTS

2018/0294681 A1* 10/2018 Bae .................. H02J 50/10
2018/0301936 A1* 10/2018 Lee .................. H04B 5/0037
2020/0203992 A1* 6/2020 Covic ................ H01F 5/00

* cited by examiner

METHODS AND SYSTEMS FOR MULTI-PHASE COIL CONTROL

FIELD

This application is generally related to wireless power charging, and specifically to methods and apparatus for transferring power from a first coil to a second coil to generate a charging field.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless power charging systems that are capable of transferring power in free space (e.g., via a wireless field) to be used to charge electric vehicles may overcome some of the deficiencies of wired charging solutions. As such, wireless power charging systems and methods that efficiently and safely transfer power for charging electric vehicles are desirable.

Inductive power transfer (IPT) systems are one means for the wireless transfer of energy. IPT may also be referred to as wireless power transfer (WPT), wireless power transmission, wireless energy transmission (WET), or electromagnetic power transfer, for example. In IPT, a primary (or "base") power device (e.g., a base pad, base wireless charging system, or some other wireless power transfer device including a power transfer element (e.g., base power transfer element)) transmits power to a secondary (or "pick-up") power receiver device (e.g., a vehicle pad, an electric vehicle wireless charging unit, or some other wireless power receiving device including a power transfer element (e.g., vehicle power transfer element)). Each of the transmitter and receiver power devices includes inductors, typically coils or windings of electric current-conveying media. An alternating current in the primary inductor produces a fluctuating magnetic field. When the secondary inductor is placed in proximity to the primary inductor, the fluctuating magnetic field induces an electromotive force (EMF) in the secondary inductor, thereby transferring power to the secondary power receiver device.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved wireless power transfer.

Certain aspects of the present disclosure provide a power transfer device for wireless charging. The power transfer device generally includes a plurality of coils configured to generate at least one charging field, the plurality of coils comprising a first coil and a second coil, and a controller. The controller is generally configured to identify that a coupling factor between the first coil and a third coil, which is external to the power transfer device, is at or below a threshold, and to adjust, based on the identification, one or more parameters associated with a current applied to the first coil to transfer power from the first coil to the second coil.

Certain aspects of the present disclosure provide a method of wireless power transfer. The method generally includes identifying that a coupling factor between a first coil and a third coil, which is external to a power transfer device comprising the first coil, is at or below a threshold; adjusting, based on the identification, one or more parameters associated with a first current applied to the first coil to transfer power from the first coil to a second coil; and applying the first current with the one or more parameters to the first coil and a second current to the second coil to generate at least one charging field that transfers power to the third coil.

Certain aspects of the present disclosure provide an apparatus for wirelessly transferring power. The apparatus generally includes a first coil; means for identifying that a coupling factor between the first coil and a third coil, which is external to the apparatus, is at or below a threshold; means for adjusting, based on the identification, one or more parameters associated with a first current applied to the first coil to transfer power from the first coil to a second coil; and means for applying the first current with the one or more parameters to the first coil and a second current to the second coil to generate at least one charging field that transfers power to the third coil.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
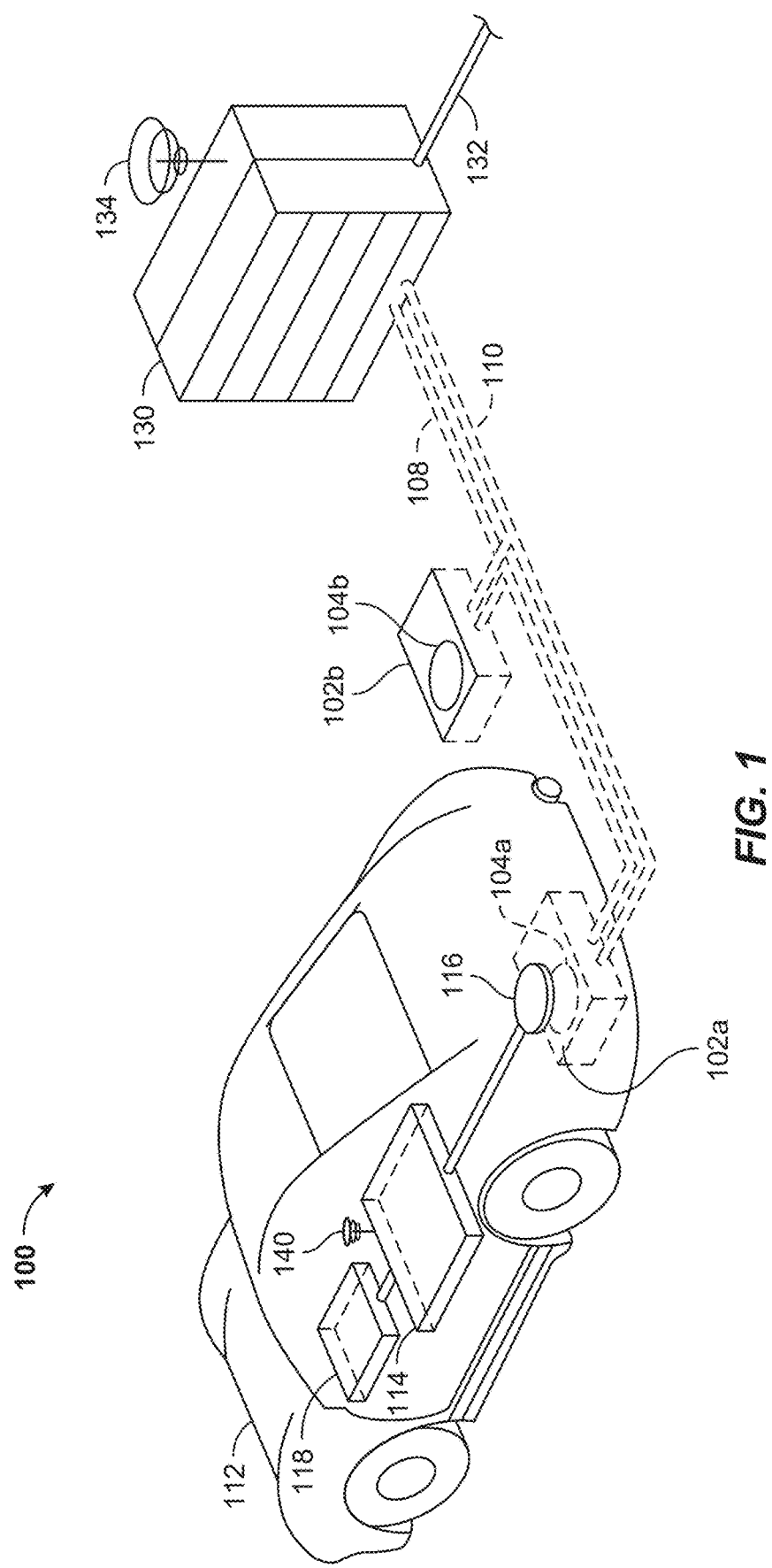
FIG. 1 illustrates a wireless power transfer system for charging an electric vehicle, according to certain aspects of the present disclosure.

Aspects of the present disclosure provide apparatus and methods for transferring power between a first coil and a second coil within the same power transfer device to generate a charging field for wireless power transfer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Example Wireless Power Charging System

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received by, captured by, or coupled into a "receiving coil" to achieve power transfer.

An electric vehicle is used herein as an example of a remote system, which is capable of receiving wireless power. An electric vehicle is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base power transfer element 104a and 104b, respectively, for wirelessly transferring power. In some other implementations (not shown in FIG. 1), base power transfer elements 104a or 104b may be stand-alone physical units and are not part of the base wireless charging system 102a or 102b.

The electric vehicle 112 may include a battery unit 118, an electric vehicle power transfer element 116, and an electric vehicle wireless charging unit 114. The electric vehicle wireless charging unit 114 and the electric vehicle power transfer element 116 constitute the electric vehicle wireless charging system. In some diagrams shown herein, the electric vehicle wireless charging unit 114 is also referred to as the vehicle charging unit (VCU). The electric vehicle power transfer element 116 may interact with the base power transfer element 104a for example, via a region of the electromagnetic field generated by the base power transfer element 104a.

In some exemplary implementations, the electric vehicle power transfer element 116 may receive power when the electric vehicle power transfer element 116 is located in an electromagnetic field produced by the base power transfer element 104a. The field may correspond to a region where energy output by the base power transfer element 104a may be captured by the electric vehicle power transfer element 116. For example, the energy output by the base power transfer element 104a may be at a level sufficient to charge or power the electric vehicle 112. In some cases, the field may correspond to a "near-field" of the base power transfer element 104a. The near-field may correspond to a region in which there are strong reactive fields resulting from the currents and charges in the base power transfer element 104a that do not radiate power away from the base power transfer element 104a. In some cases the near-field may correspond to a region that is within about ½π of a wavelength of the a frequency of the electromagnetic field produced by the base power transfer element 104*a* distant from the base power transfer element 104*a*, as will be further described below.

The electric vehicle power transfer element 116 and base power transfer element 104 as described throughout the disclosed implementations may be referred to or configured as "loop" antennas, and more specifically, multi-turn loop antennas. The elements 104 and 116 may also be referred to herein or be configured as "magnetic" antennas. The term "power transfer element" is intended to refer to a component that may wirelessly output or receive energy for coupling to another "power transfer element." The power transfer element may also be referred to as an "antenna" or a "coupler" of a type that is configured to wirelessly output or receive power. As used herein, power transfer elements 104 and 116 are examples of "power transfer components" of a type that are configured to wirelessly output, wirelessly receive, and/or wirelessly relay power. Loop (e.g., multi-turn loop) antennas may be configured to include an air core or a solid core such as a ferrite core. An air core loop antenna may allow the placement of other components within the core area. Solid core antennas including ferromagnetic or ferrimagnetic materials may allow development of a stronger electromagnetic field and improved coupling.

Local distribution center 130 may be configured to communicate with external sources (e.g., a power grid) via a communication backhaul 134, and with the base wireless charging system 102*a* via a communication link 108.

In some implementations, the electric vehicle power transfer element 116 may be aligned with the base power transfer element 104*a* and, therefore, disposed within a near-field region simply by the electric vehicle operator positioning the electric vehicle 112 such that the electric vehicle power transfer element 116 is sufficiently aligned relative to the base power transfer element 104*a*. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102*a* may have functionality for mechanically displacing and moving the power transfer elements 116 and 104*a*, respectively, relative to each other to more accurately orient or align them and develop sufficient and/or otherwise more efficient coupling therebetween.

The base wireless charging system 102*a* may be located in a variety of locations. As non-limiting examples, some suitable locations include a parking area at a home of the electric vehicle owner, parking areas reserved for electric vehicle wireless charging modeled after conventional petroleum-based filling stations, and parking lots at other locations, such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102*a* can transmit power to the electric vehicle 112 or the electric vehicle 112 can transmit power to the base wireless charging system 102*a*. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
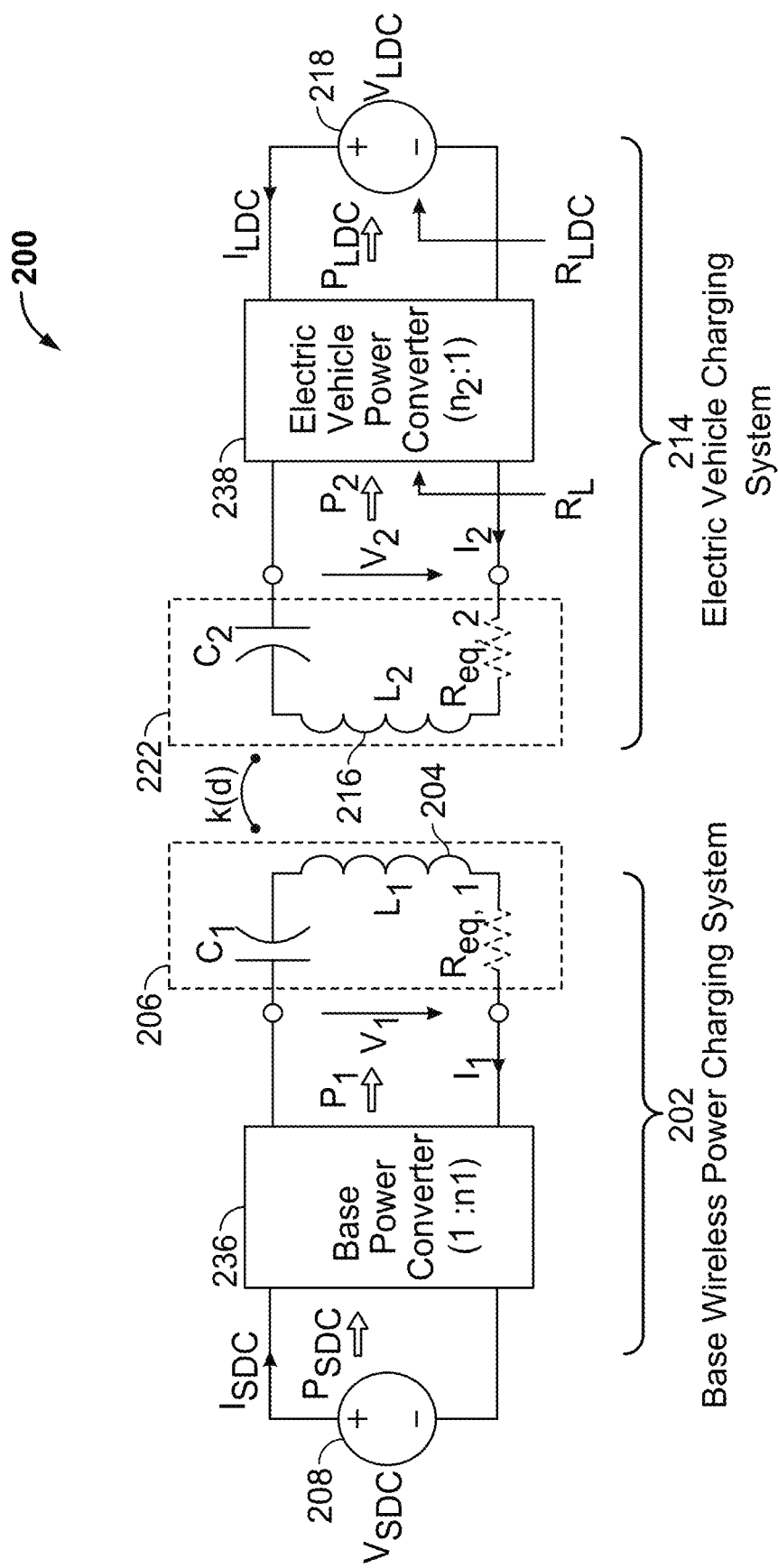
FIG. 2 is a schematic diagram of exemplary components of the wireless power transfer system of FIG. 1, according to certain aspects of the present disclosure.

FIG. 2 is a schematic diagram of exemplary components of a wireless power transfer system 200 similar to that previously discussed in connection with FIG. 1, in accordance with certain aspects of the present disclosure. The wireless power transfer system 200 may include a base resonant circuit 206 including a base power transfer element 204 having an inductance L1. The wireless power transfer system 200 further includes an electric vehicle resonant circuit 222 including an electric vehicle power transfer element 216 having an inductance L2. Implementations described herein may use capacitively loaded conductor loops (e.g., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle power transfer element 216 and the base power transfer element 204. Using resonant structures for coupling energy may be referred to as "magnetically coupled resonance," "electromagnetically coupled resonance," and/or "resonant induction." The operation of the wireless power transfer system 200 will be described based on power transfer from a base power transfer element 204 to an electric vehicle 112 (not shown), but is not limited thereto. For example, as discussed above, energy may be also transferred in the reverse direction.

Figure 4:
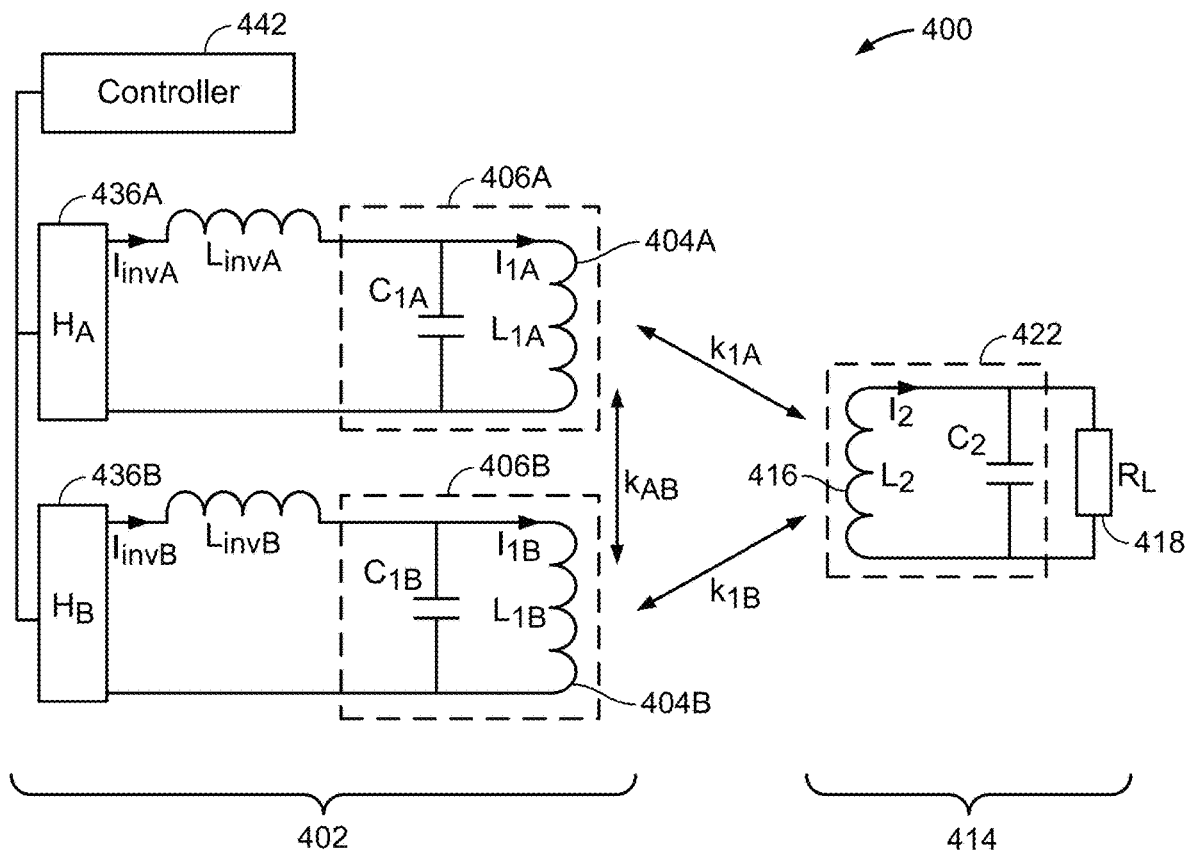
FIG. 4 is a diagram of an example wireless power transfer system for transferring power between coils, according to certain aspects of the present disclosure.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power P1 to the base resonant circuit 206 including tuning capacitor C1 in series with base power transfer element 204 to emit an electromagnetic field at the operating frequency. The series-tuned resonant circuit 206 should be construed as exemplary. In another implementation, the capacitor C1 may be coupled with the base power transfer element 204 in parallel (such as depicted in FIG. 4). In yet other implementations, the base resonant circuit 206 may be formed of several reactive elements in any combination of parallel or series topology. The capacitor C1 may be provided to form a resonant circuit with the base power transfer element 204 that resonates substantially at the operating frequency. The base power transfer element 204 receives the power P1 and wirelessly transmits power at a level sufficient to charge or power the electric vehicle. For example, the level of power provided wirelessly by the base power transfer element 204 may be on the order of kilowatts (kW) (e.g., anywhere from 1 kW to 110 kW, although actual levels may be or higher or lower).

The base resonant circuit 206 (including the base power transfer element 204 and tuning capacitor C1) and the electric vehicle resonant circuit 222 (including the electric vehicle power transfer element 216 and tuning capacitor C2) may be tuned to substantially the same frequency. The electric vehicle power transfer element 216 may be positioned within the near-field of the base power transfer element and vice versa, as further explained below. In this case, the base power transfer element 204 and the electric vehicle power transfer element 216 may become coupled to one another such that power may be transferred wirelessly from the base power transfer element 204 to the electric vehicle power transfer element 216. The series capacitor C2 may be provided to form a resonant circuit with the electric vehicle power transfer element 216 that resonates substantially at the operating frequency. The series-tuned resonant circuit 222 should be construed as being exemplary. In another implementation, the capacitor C2 may be coupled with the electric vehicle power transfer element 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances Req,1 and Req,2 represent the losses that may be inherent to the base and electric vehicle power transfer elements 204 and 216 and the tuning (anti-reactance) capacitors C1 and C2, respectively. The electric vehicle resonant circuit 222, including the electric vehicle power transfer element 216 and capacitor C2, receives and provides the power P2 to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power PLDC to the load 218. The power supply 208, base power converter 236, and base power transfer element 204 may be stationary and located at a variety of locations as discussed above. The electric vehicle load 218 (e.g., the electric vehicle battery unit), electric vehicle power converter 238, and electric vehicle power transfer element 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle power transfer element 216 to the base wireless power charging system 202 to feed power back to the grid. Each of the electric vehicle power transfer element 216 and the base power transfer element 204 may act as transmit or receive power transfer elements based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle power transfer element 216 to the electric vehicle power converter 238. Disconnecting the electric vehicle power transfer element 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base power transfer element 204 as further explained below.

As described above, in operation, during energy transfer towards an electric vehicle (e.g., electric vehicle 112 of FIG. 1), input power is provided from the power supply 208 such that the base power transfer element 204 generates an electromagnetic field for providing the energy transfer. The electric vehicle power transfer element 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that the circuits are resonating nearly or substantially at the operating frequency. Transmission losses between the base wireless power charging system 202 and electric vehicle charging system 214 are minimal when the electric vehicle power transfer element 216 is located in the near-field coupling mode region of the base power transfer element 204 as further explained below.

As stated, an efficient energy transfer occurs by transferring energy via a magnetic near-field rather than via electromagnetic waves in the far field, which may involve substantial losses due to radiation into the space. When in the near-field, a coupling mode may be established between the transmit power transfer element and the receive power transfer element. The space around the power transfer elements where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle power transfer element 216 and base power transfer element 204 as described throughout the disclosed implementations may be referred to or configured as "conductor loops," and more specifically, "multi-turn conductor loops" or coils. The base and electric vehicle power transfer elements 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g., resonant circuit 206) including a power transfer element (e.g., the base power transfer element 204 and capacitor C2) as described above. As shown in FIG. 2, inductance may generally be the inductance of the power transfer element, whereas, capacitance may be added to the power transfer element to create a resonant structure at a desired resonant frequency. Accordingly, for larger size power transfer elements using larger diameter coils exhibiting larger inductance, the value of capacitance needed to produce resonance may be lower. Inductance may also depend on a number of turns of a coil. Furthermore, as the size of the power transfer element increases, coupling efficiency may increase. This is mainly true if the size of both base and electric vehicle power transfer elements increase. Furthermore a resonant circuit including a power transfer element and tuning capacitor may be designed to have a high quality (Q) factor to improve energy transfer efficiency. For example, the Q factor may be 300 or greater.

As described above, according to some implementations, coupling power between two power transfer elements that are in the near-field of one another is disclosed. As described above, the near-field may correspond to a region around the power transfer element in which mainly reactive electromagnetic fields exist. If the physical size of the power transfer element is much smaller than the wavelength, inversely proportional to the frequency, there is no substantial loss of power due to waves propagating or radiating away from the power transfer element. Near-field coupling-mode regions may correspond to a volume that is near the physical volume of the power transfer element, typically within a small fraction of the wavelength. According to some implementations, magnetic power transfer elements, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" power transfer elements (e.g., dipoles and monopoles) or a combination of magnetic and electric power transfer elements may be used.

Figure 3:
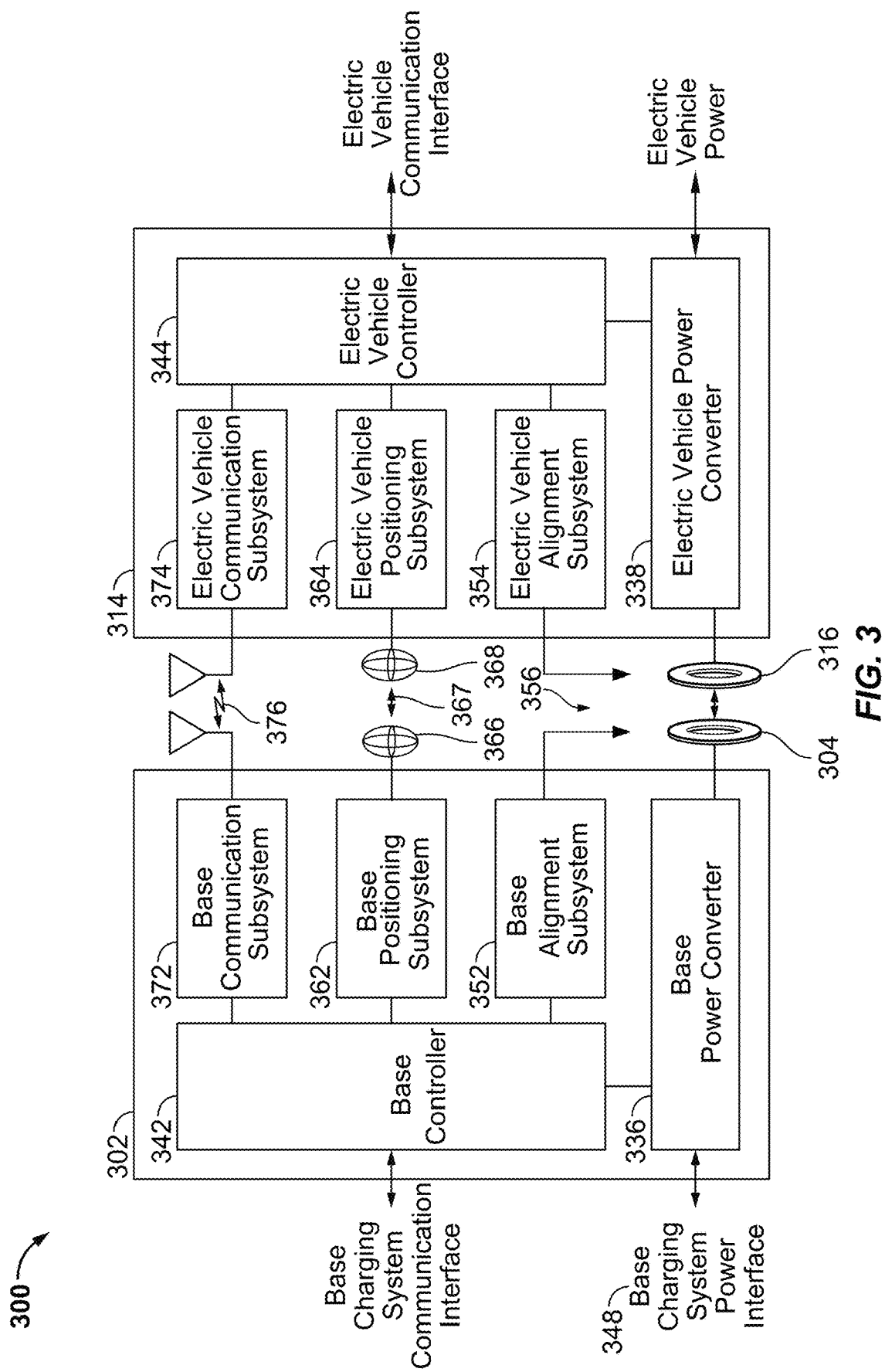
FIG. 3 is a functional block diagram showing exemplary components of the wireless power transfer system of FIG. 1, according to certain aspects of the present disclosure.

FIG. 3 is a functional block diagram showing exemplary components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a positioning link 367, using, for example, a magnetic field signal for determining a position or direction, and an alignment mechanism 356 capable of mechanically moving one or both of the base power transfer element 304 and the electric vehicle power transfer element 316. Mechanical (kinematic) alignment of the base power transfer element 304 and the electric vehicle power transfer element 316 may be controlled by the base alignment subsystem 352 and the electric vehicle alignment subsystem 354, respectively. The positioning link 367 may be capable of bi-directional signaling, meaning that positioning signals may be emitted by the base positioning subsystem or the electric vehicle positioning subsystem or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base power transfer element 304 at a frequency near or at the resonant frequency of the base resonant circuit 206 with reference to FIG. 2. The electric vehicle power transfer element 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle power transfer element 316 to a power signal suitable for charging a battery via the electric vehicle power interface.

The base wireless charging system 302 includes a base controller 342 and the electric vehicle wireless charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication subsystem 372 and electric vehicle communication subsystem 374 may include subsystems or circuits for specific application with separate communication channels and also for wirelessly communicating with other communications entities not shown in the diagram of FIG. 3. These communications channels may be separate physical channels or separate logical channels. As non-limiting examples, a base alignment subsystem 352 may communicate with an electric vehicle alignment subsystem 354 through communication link 376 to provide a feedback mechanism for more closely aligning the base power transfer element 304 and the electric vehicle power transfer element 316, for example via autonomous mechanical (kinematic) alignment, by either the electric vehicle alignment subsystem 354 or the base alignment subsystem 352, or by both, or with operator assistance.

The electric vehicle wireless charging system 314 may further include an electric vehicle positioning subsystem 364 connected to a magnetic field generator 368. The electric vehicle positioning subsystem 364 may be configured to drive the magnetic field generator 368 with currents that generate an alternating magnetic field. The base wireless charging system 302 may include a magnetic field sensor 366 connected to a base positioning subsystem 362. The magnetic field sensor 366 may be configured to generate a plurality of voltage signals under influence of the alternating magnetic field generated by the magnetic field generator 368. The base positioning subsystem 362 may be configured to receive these voltage signals and output a signal indicative of a position estimate and an angle estimate between the magnetic field sensor 366 and the magnetic field generator 368. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle power transfer elements 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may also support plug-in charging via a wired connection, for example, by providing a wired charge port (not shown) at the electric vehicle wireless charging system 314. The electric vehicle wireless charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle wireless charging system 314, the wireless power transfer system 300 may use in-band signaling via base and electric vehicle power transfer elements 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle power transfer elements 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base power transfer element 304. By way of example, a load sensing circuit monitors the current flowing to a power amplifier of the base power converter 336, which is affected by the presence or absence of active power receivers in the near-field coupling mode region of the base power transfer element 304. Detection of changes to the loading on the power amplifier may be monitored by the base controller 342 for use in determining whether to enable the base wireless charging system 302 for transmitting energy, to communicate with a receiver, or a combination thereof.

Example Methods and Systems for Multi-Phase Coil Control

Certain multi-phase power transfer devices, such as double-D quadrature coils or bi-polar coils, use separate power supply circuits (such as a power inverter) to drive each coil of the power transfer device. Because the coils are designed to be magnetically decoupled from each other (e.g., zero mutual inductance), each power supply circuit is rated for full power delivery. In other words, the maximum amount of power delivery available from each coil depends on the power rating of the respective power supply.

Certain aspects of the present disclosure provide a power transfer device, via mutual inductance between coils, that transfers power from one coil to another in the same power transfer device to increase an intensity of a charging field without increasing the power rating of the power supplies for the respective coils. Using the mutual inductance between the coils of a power transfer device may enable the reduction of the power rating for each power supply. A reduction in the power rating for the power supplies may also reduce the cost of the power transfer device. In some cases, using a power transfer device with coupled coils may enable the current supplied by base power converters (e.g., base power converters 436A, 436B illustrated in FIG. 4) to be reduced by more than 35% with respect to a power transfer device with de-coupled coils.

As an example, a power transfer device (e.g., a base pad or vehicle pad) having a first coil and a second coil may adjust one or more parameters associated with a current applied to the first coil to transfer power from the first coil to the second coil. The power transfer device may control the amplitude and/or phase of the current applied to the first coil in order to transfer power from the first coil to the second coil.

FIG. 4 illustrates a diagram of an example wireless power transfer system 400, in accordance with certain aspects of the present disclosure. As shown, the wireless power transfer system 400 includes a base wireless power charging system 402 and a vehicle charging system 414. The base wireless power charging system 402 may include base resonant circuits 406A, 406B including base power transfer elements 404A, 404B having inductances $L_{1A}$ and $L_{1B}$, respectively. The base power transfer elements 404A, 404B may be implemented as conductor loops having single or multi-turn coils.

The base wireless power charging system 402 may also include base power converters 436A, 436B. The base power converters 436A, 436B may be coupled to and controlled by a controller 442 (such as the base power controller 342 of FIG. 3). Similar to FIG. 2, the base power converters 436A, 436B may include circuitry, such as an AC-to-DC converter, configured to convert power from AC (e.g., operating at 50 or 60 Hz) to DC power at a suitable voltage level, and a DC-to-low frequency (LF) converter configured to convert DC power to power at an operating frequency suitable for wireless high power transfer. The base power converters 436A, 436B may have inductances $L_{invA}$ and $L_{invB}$ coupled in series with the base resonant circuits 406A, 406B. Each of the base power converters 436A, 436B is coupled to and separately supplies power to one of the base resonant circuits 406A, 406B including tuning capacitors $C_{1A}$, $C_{1B}$ in parallel (or in series as depicted in FIG. 2) with base power transfer elements 404A, 404B to emit an electromagnetic field at the operating frequency.

The base power transfer elements 404A, 404B may have a mutual coupling factor $k_{AB}$. The coupling factor $k_{AB}$ may determine the amount of power transferred from one of the base power transfer elements 404A, 404B to the other one of the base power transfer elements 404B, 404A. Differences between the phase and magnitude of currents $I_{1A}$ and $I_{1B}$ (such as a phase difference of 90°) may facilitate coupling between the base power transfer elements 404A, 404B. The coupling may also enable transferring power between the base power transfer elements 404A, 404B. The power transferred between the base power transfer element 404A, 404B may be given by the following expression:

$$P_{AB}=k_{AB}\sqrt{VA_A VA_B}\sin\theta_{AB}, \quad (1)$$

where $VA_A$ and $VA_B$ represent the apparent power (volt-amperes) of the base power transfer elements 404A and 404B, respectively, and $\theta_{AB}$ represents the phase difference between the currents $I_A$ and $I_B$ conducted through the base power transfer elements 404A, 404B.

The electric vehicle charging system 414 includes a vehicle resonant circuit 422 including a vehicle power transfer element 416 having an inductance $L_2$. The electric vehicle resonant circuit 422, including the electric vehicle power transfer element 416 and capacitor $C_2$, receives and provides the power to an electrical load 418 of the electric vehicle charging system 414. The electrical load 418 may include a power converter (such as a LF-to-DC converter configured to convert power at an operating frequency back to DC power) electrically coupled to a battery unit. In general, the power transferred from the base wireless power charging system 402 to the vehicle charging system 414 may be given by the following expression:

$$P_{12}=k_{12}\sqrt{VA_1 VA_2}\sin\theta_{12}, \quad (2)$$

where $k_{12}$ represents the coupling factor between the base power transfer elements 404A, 404B and the vehicle power transfer element 416, $VA_1$ and $VA_2$ represent the apparent power (volt-amperes) of the base wireless power charging system 402 (e.g., the base power transfer elements 404A and 404B) and the vehicle charging system 414 (e.g., the vehicle power transfer element 416), respectively, and $\theta_{12}$ represents the phase difference between the currents $I_1$ and $I_2$ conducted through the base wireless power charging system 402 and the vehicle charging system 414.

Figure 5:
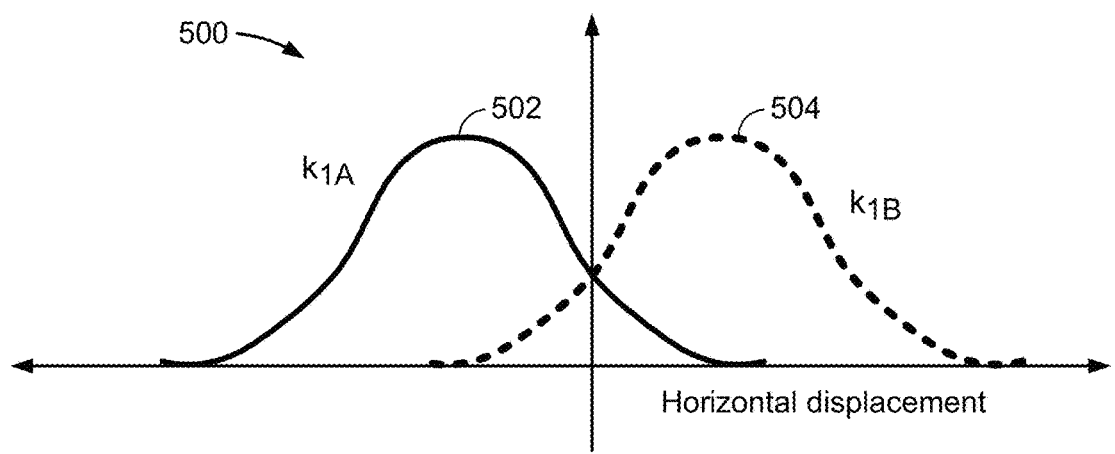
FIG. 5 is an example graph of coupling factors for the wireless power transfer system of FIG. 4, in accordance with certain aspects of the present disclosure.

The power transferred from the base wireless power charging system 402 to the vehicle charging system 414 may depend on various factors, such as the horizontal and vertical displacement of the vehicle charging system 414 relative to the base wireless power charging system 402. As an example, FIG. 5 illustrates an example graph 500 of coupling factors for the wireless power transfer system 400 of FIG. 4, in accordance with certain aspects of the present disclosure. As shown, curves 502 and 504 represent the coupling factors $k_{1A}$ and $k_{1B}$ for the respective base power transfer elements 404A, 404B with respect to the horizontal displacement between the vehicle charging system 414 and base wireless power charging system 402. FIG. 5 demonstrates that, depending on the horizontal displacement of the vehicle charging system 414, there may be a greater coupling between one of the base power transfer elements 404A, 404B and the electric vehicle power transfer element 416 than the other one of the base power transfer elements 404B, 404A.

Based on the coupling factor $k_{1A}$ or $k_{1B}$, the base wireless power charging system 402 may identify the base power transfer element 404A or 404B with the greater coupling factor ($k_{1A}$ or $k_{1B}$) to use to transfer power to the electric vehicle power transfer element 416. The base wireless power charging system 402 may also use the base power transfer element 404A or 404B with the weaker coupling factor ($k_{1A}$ or $k_{1B}$) to transfer power to the other base power transfer element 404B or 404A as further described herein.

As an example, suppose the base wireless power charging system 402 identifies that the coupling factor $k_{1B}$ (e.g., $k_{1B}$=0.111) is greater than the coupling factor $k_{1A}$ (e.g., $k_{1A}$=0.01) and that the coupling factor $k_{AB}$ (e.g., $k_{AB}$=0.03) is at or above a threshold (e.g., 0.01). The base wireless power charging system 402 may determine the phase and magnitude of the current $I_{1B}$ based on $k_{1B}$ for transferring power from the base power transfer element 404B to the vehicle power transfer element 416. The power transfer device may also determine the magnitude and/or phase of the current $I_{1A}$ based on the current $I_{1B}$ and coupling factor $k_{AB}$ for transferring power from the base power transfer element 404A to the base power transfer element 404B. Coupling between the base power transfer elements 404A, 404B may balance the inverter currents $I_{invA}$ and $I_{invB}$ generated by both of the base power converters 436A, 436B and enable a reduction in the power ratings for such power converters.

As another example, suppose the base wireless power charging system 402 identifies that the coupling factor $k_{1A}$ (e.g., $k_{1A}$=0.175) is greater than the coupling factor $k_{1B}$ (e.g., $k_{1B}$=0.04) and that the coupling factor $k_{AB}$ (e.g., $k_{AB}$=0.04) is at or above a threshold (e.g., 0.01). The base wireless power charging system 402 may determine the phase and magnitude of current $I_{1A}$ based on the coupling factor $k_{1A}$ for transferring power from the base power transfer element 404A to the vehicle power transfer element 416. The base wireless power charging system 402 may also determine the magnitude and phase of current $I_{1B}$ based on the current $I_{1A}$ and coupling factor $k_{AB}$ for transferring power from the base power transfer element 404B to the base power transfer element 404A.

In certain aspects, the vehicle charging system may include a plurality of vehicle resonant circuits. In such cases where the vehicle charging system is used to transfer power to the base wireless power charging system, the vehicle charging system may apply the techniques described herein for transferring power between coils.

Figure 6:
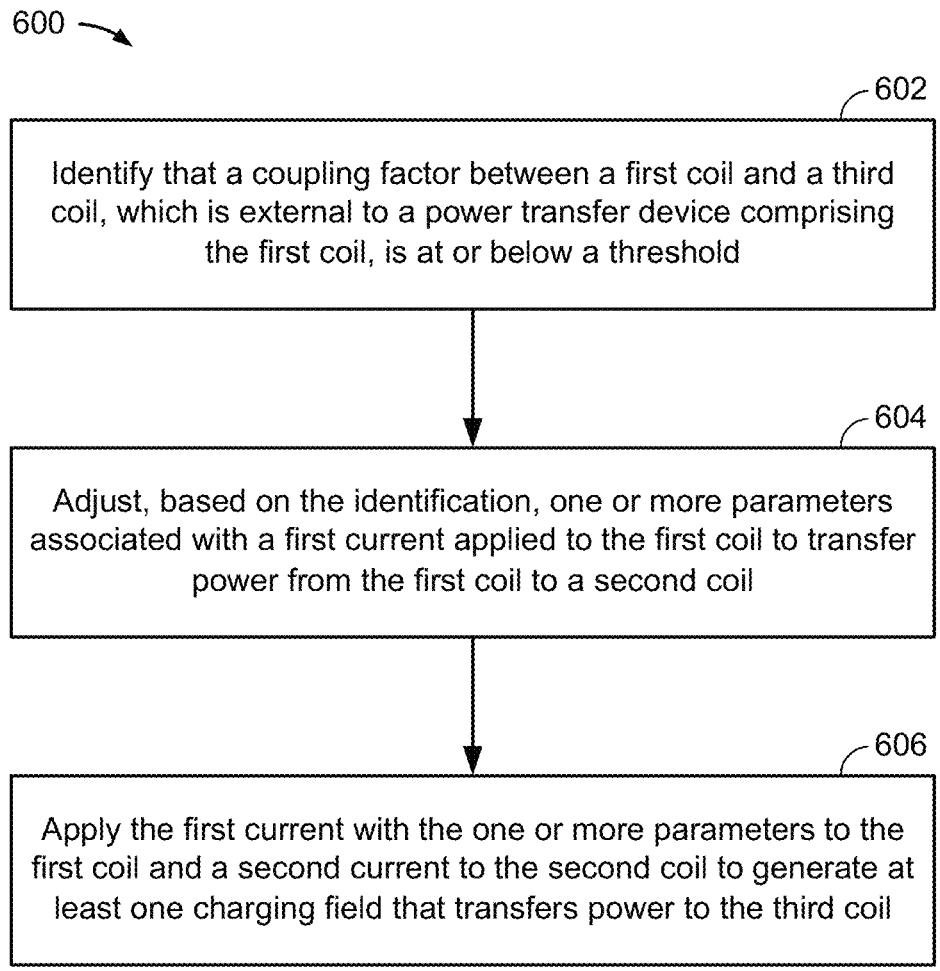
FIG. 6 is a flowchart illustrating example operations for transferring power from a first coil to a second coil of a power transfer device, in accordance with certain aspects of the present disclosure.

FIG. 6 is a flowchart illustrating example operations 600 for transferring power from a first coil to a second coil of a power transfer device, in accordance with certain aspects of the present disclosure. For example, the operations 600 may be performed by a power transfer device having a first coil and a second coil (e.g., the base wireless power charging system 402 or the electric vehicle charging system 414 of FIG. 4).

The operations 600 may begin at block 602, with a power transfer device (e.g., the base wireless power charging system 402 or the electric vehicle charging system 414 of FIG. 4) identifying that a first coupling factor (e.g., $k_{1A}$ or $k_{1B}$) between a first coil (e.g., the base power transfer element 404A) and a third coil (e.g., vehicle power transfer element 416), which is external to the power transfer device comprising the first coil, is at or below a first threshold (e.g., 0.01). At block 604, the power transfer device may adjust, based on the identification, one or more parameters associated with a first current applied to the first coil to transfer power from the first coil to a second coil (e.g., the base power transfer element 404B). At block 606, the power transfer device may apply the first current with the one or more parameters to the first coil and a second current to the second coil to generate at least one charging field that transfers power to the third coil.

In certain aspects, the power transfer device (e.g., the base wireless power charging system 402) may identify that a second coupling factor between the second coil and the third coil (e.g., $k_{1A}$ or $k_{1B}$) is at or greater than a second threshold (e.g., 0.01). The power transfer device may adjust, based on the identification of the second coupling factor, the one or more parameters associated with the first current applied to the first coil (e.g., the base power transfer element 404A) to transfer power from the first coil to a second coil (e.g., the base power transfer element 404B). The power transfer device may determine, based on the identification of the second coupling factor, to use the second coil to transfer power to the third coil and use the first coil to transfer power to the second coil as described herein.

In certain aspects, the power transfer device may identify that a third coupling factor between the first coil and the second coil (e.g., $k_{AB}$) is at or above a third threshold (e.g., 0.01). The power transfer device may adjust the one or more parameters based on the identification of the third coupling factor being at or above the third threshold. For instance, the controller 442 may be configured to identify that the third coupling factor is at or above the third threshold, and adjust the one or more parameters based on the identification of the third coupling factor being at or above the third threshold.

In certain aspects, the power transfer device may determine the coupling factors $k_{1A}$, $k_{1B}$, and/or $k_{AB}$. As an example, determining the coupling factors $k_{1A}$, $k_{1B}$, and/or $k_{AB}$ may include determining the mutual inductance between first and second coils, which may involve measuring the inductance across a first coil while energizing the first coil and shorting the second coil. In certain aspects, the coupling factors $k_{1A}$, $k_{1B}$, and/or $k_{AB}$ may be predetermined and stored in memory associated with the controller 442.

For certain aspects, the one or more parameters may include a magnitude of the current applied to the first coil and/or a phase of the current applied to the first coil. For example, the power transfer device may adjust the magnitude of the current applied to the first coil to enable coupling between the first and second coils. In another example, the power transfer device may adjust the phase of the current applied to the first coil (e.g., a phase difference of 90° between the currents to the first and second coils). The power transfer device may select the phase and the magnitude of the current applied to the first coil to induce a current in the second coil and reduce the current applied to the second coil using an inverter (e.g., the base power converter 436B).

As an example, the controller 442 may select the phase and the magnitude of the current applied to the base power transfer element 404A to induce a signal, e.g., a voltage, in the base power transfer element 404B. The induced voltage in the base power transfer element 404B enables the controller 442 to reduce the current supplied by the base power converter 436B to the resonant circuit 406B.

As another example, the controller 442 may be configured to select the phase and the magnitude of the current applied to the base power transfer element 404A to induce a current in the base power transfer element 404B and reduce an additional current applied to the base power transfer element 404B using the base power converter 436B. For certain aspects, the first coil may be operated with a different current phase and/or current magnitude than the second coil. For instance, the first coil may be configured for operation with a different current phase than the second coil.

In certain aspects, the power transfer device may adjust one or more additional parameters associated with an additional current applied to the second coil. As an example, the controller 442 may be configured to adjust the one or more additional parameters associated with the additional current applied to the second coil. The one or more additional parameters may include a magnitude of the additional current applied to the second coil or a phase of the additional current applied to the second coil. For certain aspects, rather than adjusting the one or more parameters associated with the current applied to the second coil, the power transfer device may adjust the one or more additional parameters to enable coupling between the first and second coils. For other aspects, the power transfer device may adjust both of the parameters associated with the first and second coils to enable coupling between the first and second coils.

Figure 7A:
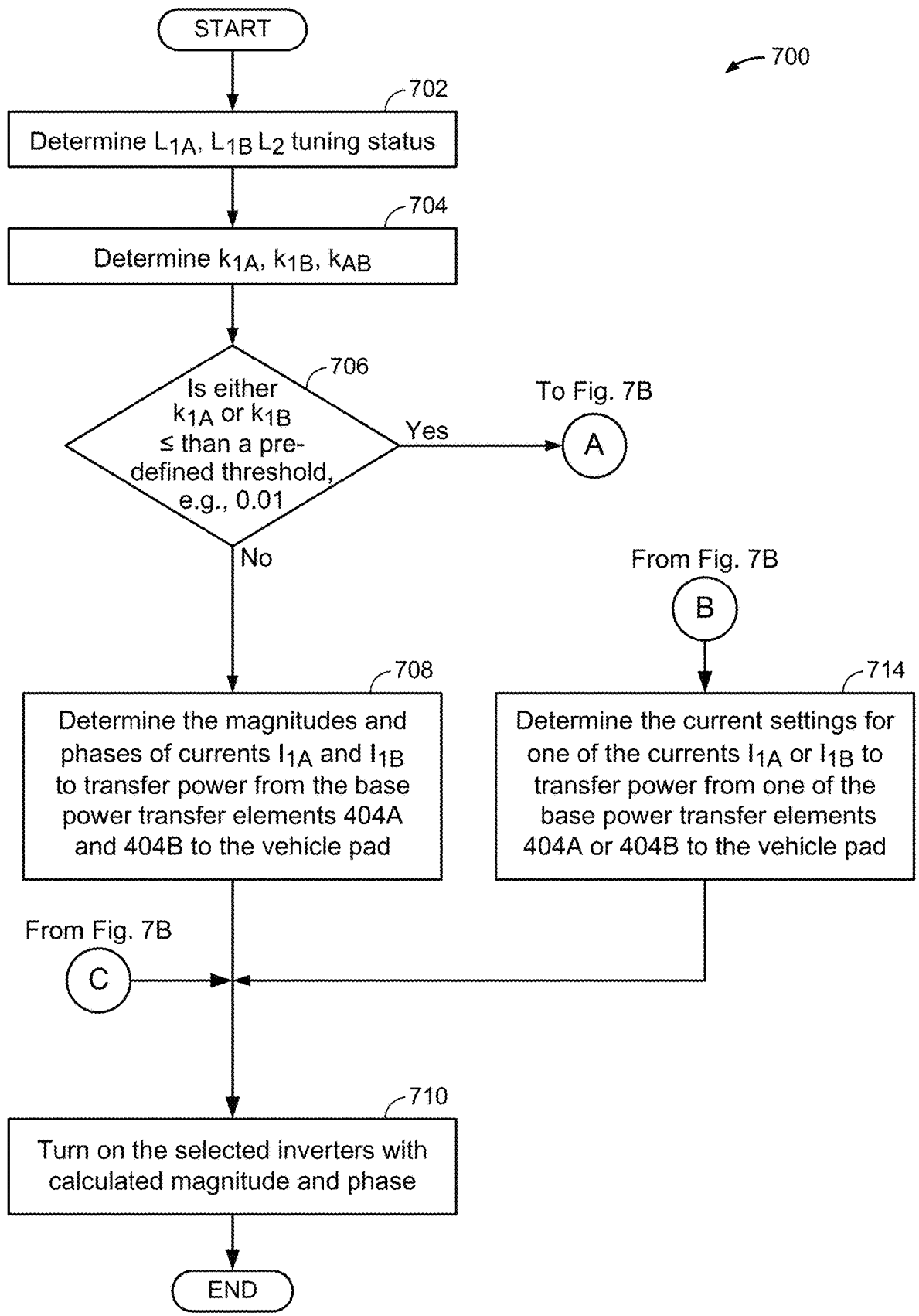
FIG. 7A is a first portion of a flowchart illustrating example operations for wireless power transfer, in accordance with certain aspects of the present disclosure.
Figure 7B:
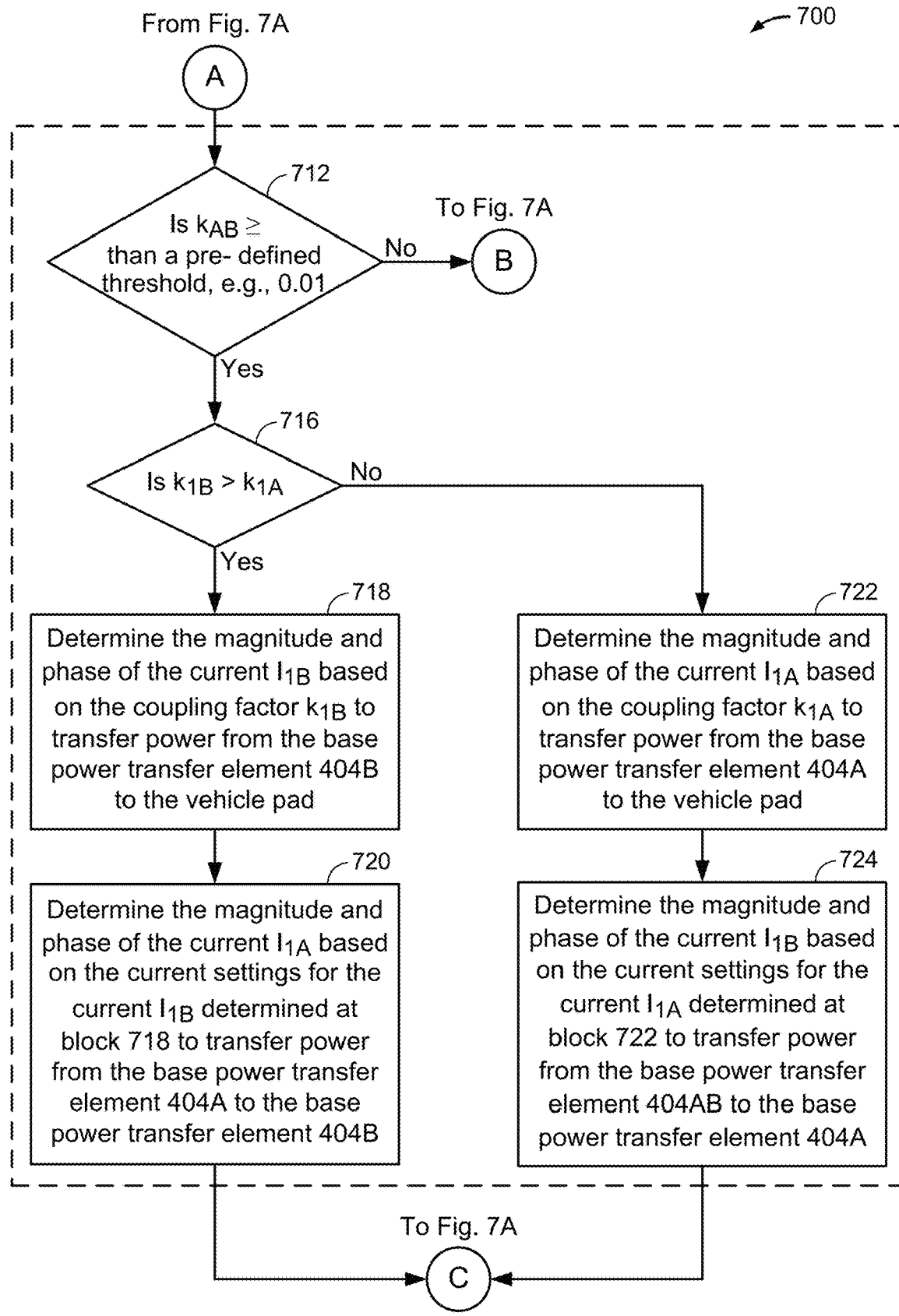
FIG. 7B is a second portion of the flowchart of FIG. 7A illustrating the example operations for wireless power transfer, in accordance with certain aspects of the present disclosure.

FIGS. 7A and 7B are a flowchart illustrating example operations 700 for transferring power from a first coil to a second coil of a power transfer device, in accordance with certain aspects of the present disclosure. For example, the operations 700 may be performed by a power transfer device having a first coil and a second coil (e.g., the base wireless power charging system 402 or the electric vehicle charging system 414 of FIG. 4).

The operations 700 may begin at block 702, with a power transfer device (e.g., the base wireless power charging system 402) determining the tuning status of inductors $L_{1A}$, $L_{1B}$, and L2, such as determining the inductances of inductors $L_{1A}$, $L_{1B}$, and $L_2$. At block 704, the power transfer device may determine the coupling factors $k_{1A}$, $k_{1B}$, or $k_{AB}$. At block 706, the power transfer device may determine whether one of the coupling factors $k_{1A}$ or $k_{1B}$ is at or below a first threshold coupling factor (e.g., 0.01). At block 708, after determining that the coupling factors $k_{1A}$ and $k_{1B}$ are not at or below the first threshold coupling factor, the power transfer device may determine the magnitudes and phases of currents $I_{1A}$ and $I_{1B}$ to transfer power from the base power transfer elements 404A and 404B to the vehicle pad. At block 710, the power transfer device may enable the base converters 436A, 436B with the determined magnitudes and phases of currents $I_{1A}$ and $I_{1B}$ determined at block 708.

Alternatively, after determining at block 706 that one of the coupling factors $k_{1A}$ or $k_{1B}$ is below the first threshold coupling factor, the power transfer device may determine whether the coupling factor $k_{AB}$ is at or above a second threshold coupling factor (e.g., 0.01) at block 712. Determining whether the coupling factor $k_{AB}$ is at or above the second threshold coupling factor (e.g., 0.01) enables the power transfer device to determine whether there is sufficient mutual coupling to transfer power between the base power transfer elements 404A and 404B. At block 714, after determining that the coupling factor $k_{AB}$ is not at or above the second threshold coupling factor (e.g., there is not enough mutual coupling to transfer power between the base power transfer elements 404A and 404B), the power transfer device may determine the current settings for one of the currents $I_{1A}$ or $I_{1B}$ to transfer power from one of the base power transfer elements 404A or 404B to the vehicle pad. At block 710, the power transfer device may enable the base converters 436A, 436B with the magnitude and phase of current $I_{1A}$ or $I_{1B}$ determined at block 714.

In the alternative, after determining at block 712 that the coupling factor $k_{AB}$ is at or above the second threshold coupling factor (e.g., there is enough mutual coupling to transfer power between the base power transfer elements 404A and 404B), the power transfer device may determine which of the base power transfer elements 404A or 404B has a stronger coupling with the vehicle pad (e.g., whether $k_{1B} > k_{1A}$) at block 716. At block 718, after determining that the coupling factor $k_{1B}$ is greater than the coupling factor $k_{1A}$ (e.g., the base power transfer elements 404A has stronger inductive coupling with the vehicle pad than the base power transfer element 404B), the power transfer device may determine the magnitude and phase of the current $I_{1B}$ based on the coupling factor $k_{1B}$ to transfer power from the base power transfer element 404B to the vehicle pad. At block 720, the power transfer device may determine the magnitude and phase of the current $I_{1A}$ based on the current settings for the current $I_{1B}$ determined at block 718 to transfer power from the base power transfer element 404A to the base power transfer element 404B. At block 710, the power transfer device may enable the base converters 436A, 436B with the magnitudes and phases of currents $I_{1A}$ and $I_{1B}$ determined at blocks 718 and 720.

As an alternative, at block 722, after determining that the coupling factor $k_{1B}$ is less than the coupling factor $k_{1A}$ (e.g., the base power transfer element 404A has stronger inductive coupling with the vehicle pad than the base power transfer element 404B), the power transfer device may determine the magnitude and phase of the current $I_{1A}$ based on the coupling factor $k_{1A}$ to transfer power from the base power transfer element 404A to the vehicle pad. At block 724, the power transfer device may determine the magnitude and phase of the current $I_{1B}$ based on the current settings for the current $I_{1A}$ determined at block 722 to transfer power from the base power transfer element 404B to the base power transfer element 404A. At block 710, the power transfer device may enable the base converters 436A, 436B with the magnitudes and phases of currents $I_{1A}$ and $I_{1B}$ determined at blocks 722 and 724.

In accordance with certain aspects, the power transfer device may select the phase and the magnitude of the current applied to the first coil to reduce a signal induced in the second coil from a field generated by the third coil (e.g., a reflective voltage). For example, the controller 442 may be configured to select the phase and the magnitude of the current to reduce a signal induced in the second coil from a field generated by the third coil.

Figure 8:
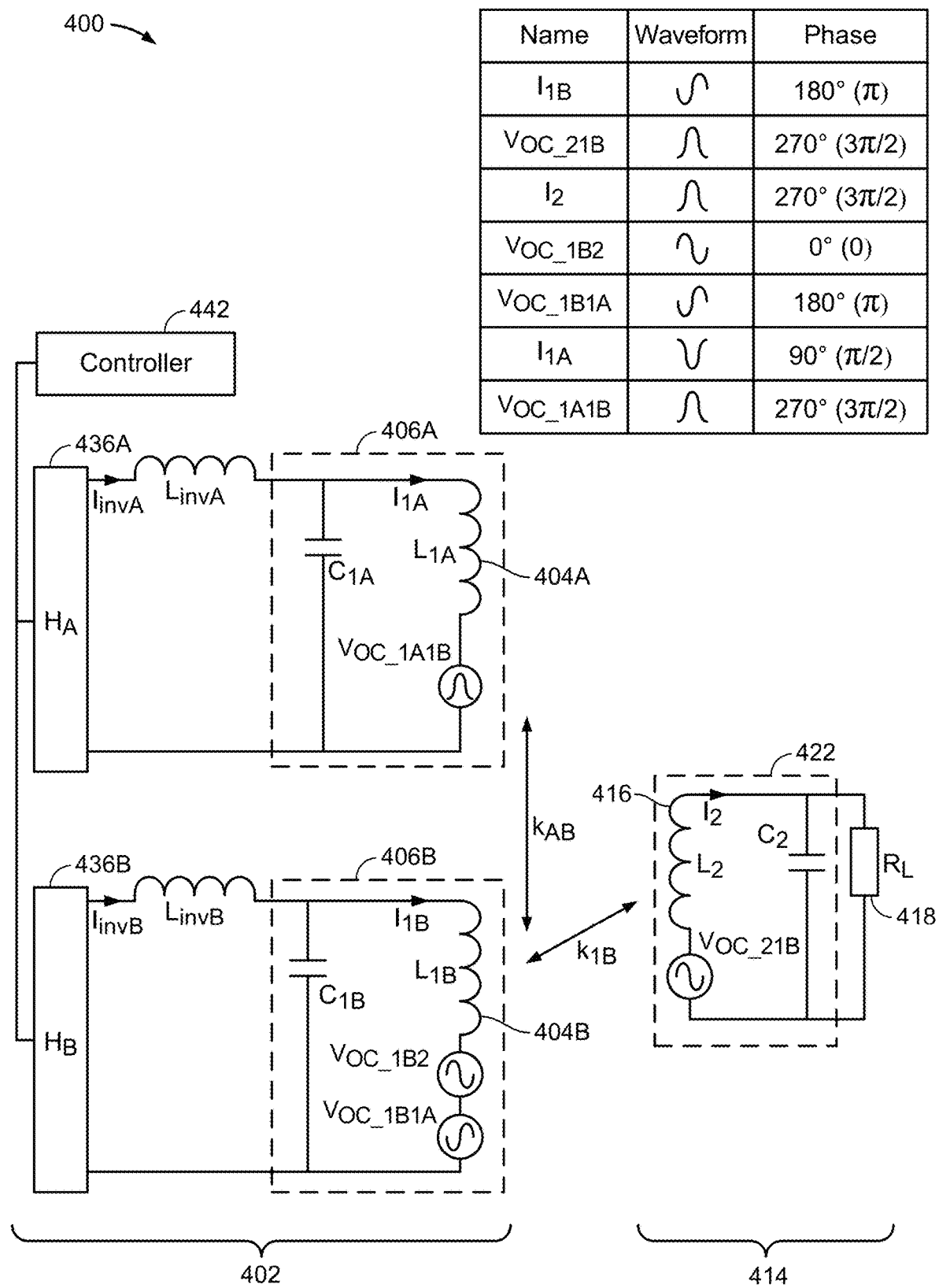
FIG. 8 depicts a diagram of the example wireless power transfer system FIG. 4 with an induced reflective voltage, in accordance with certain aspects of the present disclosure.

FIG. 8 illustrates a diagram of the example wireless power transfer system 400 where a reflective voltage is induced in the base wireless power charging system 402, in accordance with certain aspects of the present disclosure. As shown, the base power transfer element 404B may transfer power to the vehicle power transfer element 416 by inducing the voltage $V_{OC\_21B}$ in the vehicle resonant circuit 422. A reflective voltage $V_{OC\_1B2}$ from the vehicle resonant circuit 422 may be induced in the base power transfer element 404B. The phase of the current $I_{1A}$ may be adjusted to reduce or cancel the reflective voltage $V_{OC\_1B2}$ by inducing the voltage $V_{OC\_1B1A}$ in the base power transfer element 404B from the coupling between the base power transfer elements 404A, 404B. Also, shown are examples of various phases and waveforms for voltages and currents ($I_{1B}$, $V_{OC\_21B}$, $I_2$, $V_{OC\_1B2}$, $V_{OC\_1B1A}$, $I_{1A}$, and $V_{OC\_1A1B}$) that may be applied or induced to reduce or cancel the reflective voltage $V_{OC\_1B2}$.

In other aspects, the power transfer device may select the phase and the magnitude of the additional current applied to the second coil to reduce a signal induced in the second coil from the reflective field generated by the third coil. The controller may be configured to select the phase and the magnitude of the additional current to reduce a signal induced in the second coil from the reflective field generated by the third coil. For instance, the power transfer device may reduce the current applied to the second coil to reduce the reflective signal described herein.

The power transfer device and methods described herein provide various improvements for wireless power transfer. For instance, a power transfer device having coupled coils as described herein may reduce the current usage in one of the coils by more than 35% with respect to a power transfer device with de-coupled coils. The reduction in current usage may enable the power transfer device to use power supply components (e.g., switches of power inverters) having reduced power ratings, which may also reduce the cost of the power transfer device.

The various operations of methods described above may be performed by any suitable means capable of performing the corresponding functions. The means may include various hardware and/or software component(s) and/or module(s), including, but not limited to a circuit, an application-specific integrated circuit (ASIC), a field programmable gate array (FPGA) or other programmable logic device, or at least one processor. Generally, where there are operations illustrated in figures, those operations may have corresponding counterpart means-plus-function components. Means for identifying and means for adjusting may comprise a processing system, which may include one or more processors, such as the base controller 342, electric vehicle controller 344, or controller 442. Means for applying may include a power converter, such as the base power converters 436A, 436B.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a power transfer device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the functions of the communication subsystem. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the power transfer device, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6, 7A, and 7B.

Further, it should be appreciated that modules and/or other appropriate means for performing the methods and techniques described herein can be downloaded and/or otherwise obtained by a power transfer device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A power transfer device for wireless charging, comprising:
a plurality of coils configured to generate at least one charging field, the plurality of coils comprising a first coil and a second coil; and
a controller configured to:
identify that a coupling factor between the first coil and a third coil, which is external to the power transfer device, is at or below a predetermined threshold; and
adjust, based on the identification, one or more parameters associated with a current applied to the first coil to transfer power from the first coil to the second coil.

2. The power transfer device of claim 1, wherein the one or more parameters comprise at least one of a magnitude of the current applied to the first coil or a phase of the current applied to the first coil.

3. The power transfer device of claim 2, wherein the controller is configured to select the phase and the magnitude of the current to reduce a signal induced in the second coil from a field generated by the third coil.

4. The power transfer device of claim 2, further comprising a power converter coupled to the second coil, and wherein the controller is configured to select the phase and the magnitude of the current to reduce an additional current supplied by the power converter to the second coil.

5. The power transfer device of claim 1, wherein the controller is configured to adjust one or more additional parameters associated with an additional current applied to the second coil.

6. The power transfer device of claim 5, wherein the one or more additional parameters comprise at least one of a magnitude of the additional current applied to the second coil or a phase of the additional current applied to the second coil.

7. The power transfer device of claim 6, wherein the controller is configured to select the phase and the magnitude of the additional current to reduce a signal induced in the second coil from a field generated by the third coil.

8. The power transfer device of claim 1, wherein the controller is configured to:
identify that an additional coupling factor between the first coil and the second coil is at or above an additional predetermined threshold, and
adjust the one or more parameters based on the identification of the additional coupling factor being at or above the additional predetermined threshold.

9. The power transfer device of claim 1, wherein the first coil is configured for operation with a different phase than the second coil.

10. The power transfer device of claim 1, wherein the predetermined threshold represents a value that enables the controller to determine whether mutual coupling between the first coil and the third coil is sufficient to transfer power between the first coil and the third coil.

11. A method of wireless power transfer, comprising:
identifying that a coupling factor between a first coil and a third coil, which is external to a power transfer device comprising the first coil, is at or below a predetermined threshold;
adjusting, based on the identification, one or more parameters associated with a first current applied to the first coil to transfer power from the first coil to a second coil; and
applying the first current with the one or more parameters to the first coil and a second current to the second coil to generate at least one charging field that transfers power from the second coil to the third coil.

12. The method of claim 11, wherein the one or more parameters comprise at least one of a magnitude of the first current applied to the first coil or a phase of the first current applied to the first coil.

13. The method of claim 12, wherein adjusting the one or more parameters comprises selecting the phase and the magnitude of the first current to reduce a signal induced in the second coil from a field generated by the third coil.

14. The method of claim 12, wherein adjusting the one or more parameters comprises selecting the phase and the magnitude of the first current to reduce the second current supplied by a power converter to the second coil.

15. The method of claim 11, further comprising:
adjusting one or more additional parameters associated with the second current applied to the second coil, wherein applying the second current comprises applying the second current with the additional one or more parameters to the second coil.

16. The method of claim 15, wherein the one or more additional parameters comprise at least one of a magnitude of the second current applied to the second coil or a phase of the second current applied to the second coil.

17. The method of claim 16, wherein adjusting the one or more additional parameters comprises selecting the phase and the magnitude of the second current to reduce a signal induced in the second coil from a field generated by the third coil.

18. The method of claim 11, further comprising:
identifying that an additional coupling factor between the first coil and the second coil is at or above an additional predetermined threshold, wherein adjusting the one or more parameters comprises adjusting the one or more parameters based on the identification of the additional coupling factor being at or above the additional predetermined threshold.

19. The method of claim 11, wherein the first current has a different phase than the second current.

20. The method of claim 11, wherein the predetermined threshold comprises a value that enables a determination of whether the first coil and the third coil have sufficient mutual coupling to transfer power between the first coil and the third coil.

21. An apparatus for wirelessly transferring power, comprising:
means for identifying that a coupling factor between a first coil and a third coil is at or below a predetermined threshold, the apparatus comprising the first coil, the third coil being external to the apparatus;
means for adjusting, based on the identification, one or more parameters associated with a first current applied to the first coil to enable power to be transferred from the first coil to a second coil of the apparatus; and
means for applying the first current with the one or more adjusted parameters to the first coil and a second current to the second coil to generate a first charging field that transfers power from the first coil to the second coil and a second charging field that transfers power from the second coil to the third coil.

22. The apparatus of claim 21, wherein the one or more parameters comprise at least one of a magnitude of the current applied to the first coil or a phase of the current applied to the first coil.

23. The apparatus of claim 21, wherein the predetermine threshold represents a value usable to determine whether the first coil and the third coil have sufficient mutual coupling for transferring power between the first coil and the third coil.

* * * * *